United States Patent
Onishi et al.

(10) Patent No.: US 10,489,514 B2
(45) Date of Patent: Nov. 26, 2019

(54) TEXT VISUALIZATION SYSTEM, TEXT VISUALIZATION METHOD, AND RECORDING MEDIUM

(71) Applicant: NEC Corporation, Tokyo (JP)

(72) Inventors: Takashi Onishi, Tokyo (JP); Kosuke Yamamoto, Tokyo (JP); Masaaki Tsuchida, Tokyo (JP); Susumu Akamine, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/558,635

(22) PCT Filed: Mar. 18, 2015

(86) PCT No.: PCT/JP2015/001510
§ 371 (c)(1),
(2) Date: Sep. 15, 2017

(87) PCT Pub. No.: WO2016/147219
PCT Pub. Date: Sep. 22, 2016

(65) Prior Publication Data
US 2018/0089181 A1  Mar. 29, 2018

(51) Int. Cl.
*G06F 17/28* (2006.01)
*G06F 16/22* (2019.01)
(Continued)

(52) U.S. Cl.
CPC .......... *G06F 17/2872* (2013.01); *G06F 16/00* (2019.01); *G06F 16/22* (2019.01);
(Continued)

(58) Field of Classification Search
None
See application file for complete search history.

(56) References Cited

U.S. PATENT DOCUMENTS

2008/0016050 A1* 1/2008 Stensmo ............. G06F 16/3325
2011/0276322 A1* 11/2011 Sandor ................ G06F 17/2785
704/9
(Continued)

FOREIGN PATENT DOCUMENTS

JP  2002-108894 A  4/2002
JP  2003-216222 A  7/2003
(Continued)

OTHER PUBLICATIONS

"Text Mining Solution—IBM Content Analyzer V8.4—Introduction and Utilization Cases", [online], IBM Japan Ltd., [retrieved on Feb. 17, 2015], the Internet URL:http://www.ibm.com/developerworks/jp/data/library/ecm/j-d_icaseminar01/pdf/ica01.pdf, 48 pages.

(Continued)

*Primary Examiner* — Sanchita Roy
(74) *Attorney, Agent, or Firm* — Sughrue Mion, PLLC

(57) ABSTRACT

A text visualization system allows a user to ascertain a relationship of viewpoints between categories in clustering of documents including texts of a plurality of categories. Each of a plurality of documents includes texts of each of a plurality of categories. A text and an element text that entails the text among texts included in the plurality of documents are set with respect to each of the categories. A text display displays a plurality of texts of each of one or more categories among the plurality of categories. The text display, in response to receiving a designation of a text of a specific category by a reception unit, extracts, from a plurality of texts of another category, a text that entails an element text of the another category included in a document including an element text that entails the text of the specific category, and displays the extracted text.

7 Claims, 13 Drawing Sheets

| CATEGORY | CLUSTER | REPRESENTATIVE TEXT | ELEMENT TEXT |
|---|---|---|---|
| PHENOMENON | A1 | T1a | T1a, T2a, T7a |
| | A2 | T4a | T4a, T6a, T7a |
| | A3 | T5a | T3a, T5a, T6a |
| CAUSE | B1 | T1b | T1b, T7b |
| | B2 | T5b | T2b, T5b |
| | B3 | T4b | T3b, T4b, T6b |
| MEASURE | C1 | T1c | T1c, T7c |
| | C2 | T5c | T2c, T5c, T7c |
| | C3 | T3c | T3c, T4c, T6c |

(51) Int. Cl.
  *G06F 16/93*  (2019.01)
  *G06F 16/25*  (2019.01)
  *G06F 17/27*  (2006.01)
  *G06F 16/00*  (2019.01)
  *G06F 17/24*  (2006.01)

(52) U.S. Cl.
  CPC ............ *G06F 16/252* (2019.01); *G06F 16/93* (2019.01); *G06F 17/2775* (2013.01); *G06F 17/245* (2013.01)

(56) References Cited

U.S. PATENT DOCUMENTS

2013/0332450 A1* 12/2013 Castelli ................. G06F 17/278 707/722
2014/0372102 A1* 12/2014 Hagege ................. G06F 17/278 704/9

FOREIGN PATENT DOCUMENTS

| JP | 2011-118869 A | 6/2011 |
| JP | 2012-073804 A | 4/2012 |
| JP | 5494999 B1 | 5/2014 |
| WO | 2008/146456 A1 | 12/2008 |

OTHER PUBLICATIONS

"NEC Technology Automatically Groups Vast Amounts of Text Data According to Meaning", [online], NEC Corporation, [retrieved on Feb. 17, 2015], the Internet URL:http://jpn.nec.com/press/201411/20141118_02.html, 2 pages.
International Search Report of PCT/JP2015/001510 dated Jun. 23, 2015 [PCT/ISA/210].
Written Opinion of PCT/JP2015/001510 dated Jun. 23, 2015 [PCT/ISA/237].

* cited by examiner

Fig. 5

| DOCUMENT IDENTIFIER | ACQUISITION DATE AND TIME | CATEGORY | TEXT |
|---|---|---|---|
| D1 | 2015/1/1 | PHENOMENON | (T1a) NO BOOT OCCURS |
| | | CAUSE | (T1b) FILE WAS DAMAGED |
| | | MEASURE | (T1c) RE-INSTALLATION WAS EXECUTED |
| D2 | 2015/1/2 | PHENOMENON | (T2a) NO START-UP OCCURS |
| | | CAUSE | (T2b) HARD DISK FAILED |
| | | MEASURE | (T2c) HARD DISK WAS REPLACED |
| D3 | 2015/1/3 | PHENOMENON | (T3a) FREEZE FREQUENTLY OCCURS |
| | | CAUSE | (T3b) MAIN BOARD WAS BROKEN |
| | | MEASURE | (T3c) PC WAS REPLACED |
| D4 | 2015/1/4 | PHENOMENON | (T4a) RE-BOOT OCCURRED |
| | | CAUSE | (T4b) MAIN BOARD FAILED |
| | | MEASURE | (T4c) PERSONAL COMPUTER WAS REPLACED |
| D5 | 2015/1/5 | PHENOMENON | (T5a) FREEZE OCCURRED |
| | | CAUSE | (T5b) HDD WAS BROKEN |
| | | MEASURE | (T5c) HDD IS REPLACED |
| D6 | 2015/1/6 | PHENOMENON | (T6a) RE-BOOT AUTOMATICALLY OCCURRED AFTER FREEZE |
| | | CAUSE | (T6b) MOTHER BOARD MAY BE PROBLEMATIC |
| | | MEASURE | (T6c) REPLACEMET WAS MADE WITH NEW PC |
| D7 | 2015/1/7 | PHENOMENON | (T7a) NO BOOT OCCURS AFTER RE-BOOT REPETITION |
| | | CAUSE | (T7b) DATA SEEM TO BE BROKEN |
| | | MEASURE | (T7c) HDD WAS REPLACED AND RE-INSTALLATION WAS EXECUTED |

Fig. 7

| CATEGORY | CLUSTER | REPRESENTATIVE TEXT | ELEMENT TEXT |
|---|---|---|---|
| PHENOMENON | A1 | T1a | T1a, T2a, T7a |
| | A2 | T4a | T4a, T6a, T7a |
| | A3 | T5a | T3a, T5a, T6a |
| CAUSE | B1 | T1b | T1b, T7b |
| | B2 | T5b | T2b, T5b |
| | B3 | T4b | T3b, T4b, T6b |
| MEASURE | C1 | T1c | T1c, T7c |
| | C2 | T5c | T2c, T5c, T7c |
| | C3 | T3c | T3c, T4c, T6c |

Fig. 8

| CLUSTER (PHENOMENON) | NUMBER |
|---|---|
| (T1a) NO BOOT OCCURS | 3 |
| (T4a) RE-BOOT OCCURRED | 3 |
| (T5a) FREEZE OCCURRED | 3 |

| CLUSTER (CAUSE) | NUMBER |
|---|---|
| (T1b) FILE WAS DAMAGED | 2 |
| (T5b) HDD WAS BROKEN | 2 |
| (T4b) MAIN BOARD FAILED | 3 |

| CLUSTER (MEASURE) | NUMBER |
|---|---|
| (T1c) RE-INSTALLATION WAS EXECUTED | 2 |
| (T5c) HDD IS REPLACED | 3 |
| (T3c) PC WAS REPLACED | 3 |

| DOCUMENT IDENTIFIER | ACQUISITION DATE AND TIME | DETAILED TEXT |||
|---|---|---|---|---|
| | | PHENOMENON | CAUSE | MEASURE |
| D1 | 2015/01/01 | (T1a) NO BOOT OCCURS | (T1b) FILE WAS DAMAGED | (T1c) RE-INSTALLATION WAS EXECUTED |
| D2 | 2015/01/02 | (T2a) NO START-UP OCCURS | (T2b) HARD DISK FAILED | (T2c) HARD DISK WAS REPLACED |
| D3 | 2015/01/03 | (T3a) FREEZE FREQUENTLY OCCURS | (T3b) MAIN BOARD WAS BROKEN | (T3c) PC WAS REPLACED |
| D4 | 2015/01/04 | (T4a) RE-BOOT OCCURRED | (T4b) MAIN BOARD FAILED | (T4c) PERSONAL COMPUTER WAS REPLACED |
| D5 | 2015/01/05 | (T5a) FREEZE OCCURRED | (T5b) HDD WAS BROKEN | (T5c) HDD IS REPLACED |
| D6 | 2015/01/06 | (T6a) RE-BOOT AUTOMATICALLY OCCURRED AFTER FREEZE | (T6b) MOTHER BOARD MAY BE PROBLEMATIC | (T6c) REPLACEMET WAS MADE WITH NEW PC |
| D7 | 2015/01/07 | (T7a) NO BOOT OCCURS AFTER RE-BOOT REPETITION | (T7b) DATA SEEM TO BE BROKEN | (T7c) HDD WAS REPLACED AND RE-INSTALLATION WAS EXECUTED |

Fig. 13

ANALYSIS RESULT (90)

91a

| CLUSTER (PHENOMENON) | CLUSTER (CAUSE) | | |
|---|---|---|---|
| | (T1b) FILE WAS DAMAGED | (T5b) HDD WAS BROKEN | (T4b) MAIN BOARD FAILED |
| (T1a) NO BOOT OCCURS | 2 | 1 | 0 |
| (T4a) RE-BOOT OCCURRED | 1 | 0 | 2 |
| (T5a) FREEZE OCCURRED | 0 | 1 | 2 |

91b

| CLUSTER (CAUSE) | CLUSTER (MEASURE) | | |
|---|---|---|---|
| | (T1c) RE-INSTALLATION WAS EXECUTED | (T5c) HDD IS REPLACED | (T3c) PC WAS REPLACED |
| (T1b) FILE WAS DAMAGED | 2 | 1 | 0 |
| (T5b) HDD WAS BROKEN | 0 | 2 | 0 |
| (T4b) MAIN BOARD FAILED | 0 | 0 | 3 |

91c

| CLUSTER (PHENOMENON) | CLUSTER (MEASURE) | | |
|---|---|---|---|
| | (T1c) RE-INSTALLATION WAS EXECUTED | (T5c) HDD IS REPLACED | (T3c) PC WAS REPLACED |
| (T1a) NO BOOT OCCURS | 2 | 2 | 0 |
| (T4a) RE-BOOT OCCURRED | 1 | 1 | 2 |
| (T5a) FREEZE OCCURRED | 0 | 1 | 2 |

TEXT VISUALIZATION SYSTEM, TEXT VISUALIZATION METHOD, AND RECORDING MEDIUM

CROSS REFERENCE TO RELATED APPLICATIONS

This application is a National Stage of International Application No. PCT/JP2015/001510, filed Mar. 18, 2015, the contents of which are incorporated herein by reference in its entirety.

TECHNICAL FIELD

The present invention relates to a text visualization system, a text visualization method, and a recording medium, and in particular, to a text visualization system, a text visualization method, and a recording medium for clustering of texts.

BACKGROUND ART

As a technique for ascertaining an outline of a large amount of document data, there is a clustering technique of extracting viewpoints included in a plurality of texts and classifying the plurality of texts with respect to each extracted viewpoint.

As such a text clustering technique, for example, NPL 1 discloses a technique of extracting, based on a keyword included in a text, intentions included in a plurality of texts.

In a keyword-based clustering technique, classification is executed based on, for example, a share degree of a keyword among texts. However, in general, in each text to be clustered, a plurality of viewpoints may be mixed. Therefore, even when classification is executed based on a share degree of a keyword, a viewpoint of each cluster may become unclear due to an oversight of a viewpoint, classification of texts having different viewpoints into the same cluster, or the like. In this case, a user is forced, in order to clarify a viewpoint, to perform cumbersome work such that texts of a plurality of clusters are confirmed and the texts are reclassified.

Further, as another technique of text clustering, NPL 2 discloses an entailment clustering technique of extracting an entailment relation between texts and classifying texts having an entailment relation into the same cluster.

The entailment clustering refers to clustering based on an entailment relation that is a relation of meanings between texts. By using entailment clustering, viewpoints included in texts to be analyzed can be extracted without omission, together with representative texts representing an outline of a cluster, and commonly entailed by texts in a cluster.

As a related technique, PTL 1 discloses a technique of generating an entailment graph representing an entailment relation, based on an entailment relation between texts. Further, PTL 2 discloses a technique of viewing and tallying pieces of failure information such as "phenomena," "causes," "actions," and "measures" relating to failures of products.

CITATION LIST

Patent Literature

[PTL 1] Japanese Patent No. 5494999
[PTL 2] Japanese Patent Application Laid-open Publication No. 2003-216222

Non Patent Literature

[NPL 1] "Text Mining Solution-IBM Content Analyzer V8.4-Introduction and Utilization Cases", [online], IBM Japan Ltd., [retrieved on Feb. 17, 2015], the Internet <URL:http://www.ibm.com/developerworks/jp/data/library/ecm/j-d_icaseminar01/pdf/ica01.pdf>
[NPL 2] "NEC Technology Automatically Groups Vast Amounts of Text Data According to Meaning", [online], NEC Corporation, [retrieved on Feb. 17, 2015], the Internet <URL:http://jpn.nec.com/press/201411/20141118_02.html>

SUMMARY OF INVENTION

Technical Problem

A document to be clustered may include texts of a plurality of categories. In this case, it is conceivable to apply the above-described technique of NPL 2 to each of a plurality of categories to extract a viewpoint of a subject of each category.

Herein, there may be a relationship of some sort in subjects between categories such as a phenomenon, a cause, and a measure, depending on a document to be clustered. However, there is a technical problem that, even if entailment clustering is merely executed for each of a plurality of categories, it is difficult to ascertain a relationship of viewpoints between categories.

An object of the present invention is to provide a text visualization system, a text visualization method, and a recording medium, being capable of solving the above-described technical problem and allowing a user to ascertain a relationship of viewpoints between categories in clustering of documents including texts of a plurality of categories.

Solution to Problem

A text visualization system according to an exemplary aspect of the invention, accessibly connected to storage means that stores texts of each of a plurality of categories included in each of a plurality of documents and information indicating a representative text and an element text that entails the representative text among texts included in the plurality of documents with respect to each of the plurality of categories, includes: first display means for displaying a plurality of representative texts of each of one or more categories among the plurality of categories; and reception means for receiving a designation of a representative text of a specific category among the plurality of representative texts of each of the one or more categories, wherein the first display means extracts, in response to receiving the designation of the representative text of the specific category, from a plurality of representative texts of another category, a representative text that entails an element text of the another category included in a document including an element text that entails the representative text of the specific category, and displays the extracted representative text.

A text visualization method according to an exemplary aspect of the invention, for texts of each of a plurality of categories included in each of a plurality of documents, a representative text and an element text that entails the representative text being set among the texts included in the plurality of documents with respect to each of the plurality of categories, includes: displaying a plurality of representative texts of each of one or more categories among the plurality of categories; and receiving a designation of a representative text of a specific category among the plurality of representative texts of each of the one or more categories, wherein, in response to receiving the designation of the representative text of the specific category, from a plurality of representative texts of another category, a representative text that entails an element text of the another category included in a document including an element text that entails the representative text of the specific category is extracted, and the extracted representative text is displayed.

A computer readable storage medium according to an exemplary aspect of the invention records thereon a program causing a computer to perform a text visualization method, for texts of each of a plurality of categories included in each of a plurality of documents, a representative text and an element text that entails the representative text being set among the texts included in the plurality of documents with respect to each of the plurality of categories, including: displaying a plurality of representative texts of each of one or more categories among the plurality of categories; and receiving a designation of a representative text of a specific category among the plurality of representative texts of each of the one or more categories, wherein, in response to receiving the designation of the representative text of the specific category, from a plurality of representative texts of another category, a representative text that entails an element text of the another category included in a document including an element text that entails the representative text of the specific category is extracted, and the extracted representative text is displayed.

Advantageous Effects of Invention

A technical advantageous effect of the present invention is to allow a user to ascertain a relationship of viewpoints between categories in clustering of documents including texts of a plurality of categories.

BRIEF DESCRIPTION OF DRAWINGS

FIG. 5 is a diagram illustrating an example of text data to be clustered in the first example embodiment of the present invention.

FIG. 7 is a diagram illustrating an example of a clustering result in the first example embodiment of the present invention.

FIG. 8 is a diagram illustrating an example of a clustering screen 80 (before designating a representative text) in the first example embodiment of the present invention.

FIG. 13 is a diagram illustrating an example of an analysis screen 90 in the second example embodiment of the present invention.

DESCRIPTION OF EMBODIMENTS

First, entailment clustering that is a clustering technique of texts used in example embodiments of the present invention will be described. In the entailment clustering, as described in NPL 2, clustering is executed based on an entailment relation that is a relation of meanings between texts. In the example embodiments of the present invention, the entailment relation is defined as follows in the same manner as in PTL 1. It is defined that, in the case where a content of a second text is true when a content of a first text is true, the first text entails the second text. Further, it may also be defined that, in the case where a content of a second text is read from a content of a first text, the first text entails the second text.

In order to facilitate understanding of an entailment relation, specific examples are described.

Specific Example 1

First text: President Obama is living in the White House.
Second text: President Obama is living in America.
In this case, a content of the second text is true when a content of the first text is true, and therefore it can be said that the first text entails the second text.

Specific Example 2

First text: Prime Minister Tsuyoshi Inukai was assassinated by naval officers.
Second Text: Prime Minister Tsuyoshi Inukai died.
In this case, a content of the second text is true when a content of the first text is true, and therefore it can be said that the first text entails the second text.

Herein, a "representative text" and an "element text" will be defined. When entailment clustering is executed for a set of texts, a representative text and an element text are determined. A relation between a representative text and an element text is a relation that a content of the representative text is true when a content of the element text is true. In other words, a relation between a representative text and an element text is a relation that the element text entails the representative text.

Figure 14:
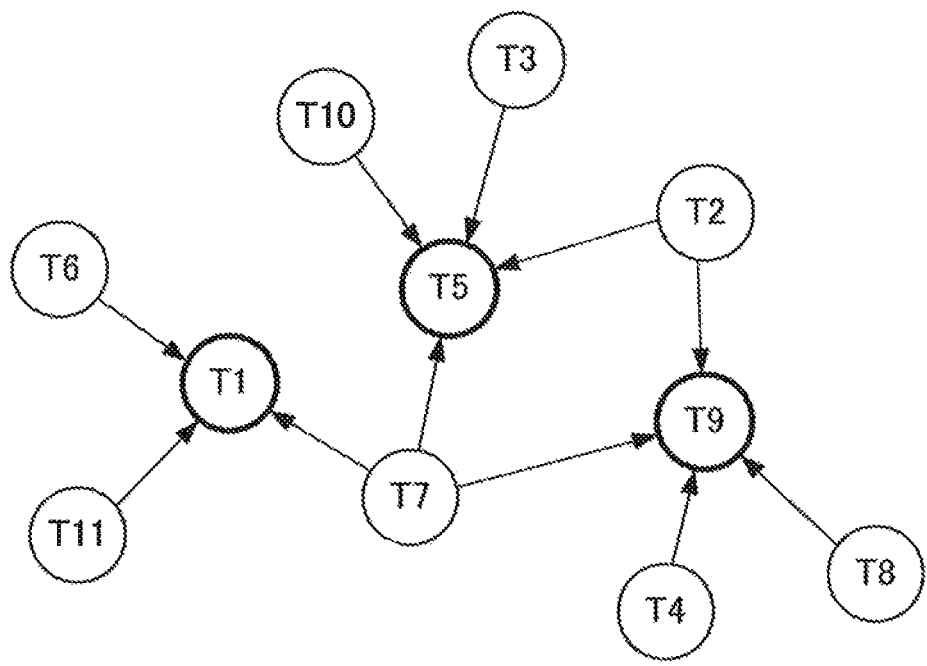
FIG. 14 is a diagram illustrating an example of relations among representative texts and element texts in the example embodiments of the present invention.

FIG. 14 is a diagram illustrating an example of relations among representative texts and element texts in the example embodiments of the present invention. In order to facilitate understanding of a representative text and an element text, description will be made using FIG. 14. FIG. 14 illustrates a situation in which entailment clustering has been executed for eleven texts from T1 to T11. A circular symbol in FIG. 14 indicates one text. An arrow in FIG. 14 indicates that a text at a source of the arrow entails a text at a destination of the arrow. In FIG. 14, texts T6, T7, and T11 entail a text T1.

In the same manner, texts T2, T3, T7, and T10 entail a text T5, and texts T2, T4, T7, and T8 entail a text T9. At that time, the texts T6, T7, and T11 are element texts of a representative text T1. In the same manner, the texts T2, T3, T7, and T10 are element texts of a representative text T5. In the same manner, the texts T2, T4, T7, and T8 are element texts of a representative text T9.

Herein, a representative text itself may be handled as an element text. For example, the texts T1, T6, T7, and T11 may be element texts of the representative text T1.

First Example Embodiment

Next, a first example embodiment of the present invention will be described.

First, a configuration of the first example embodiment of the present invention will be described.

Figure 2:
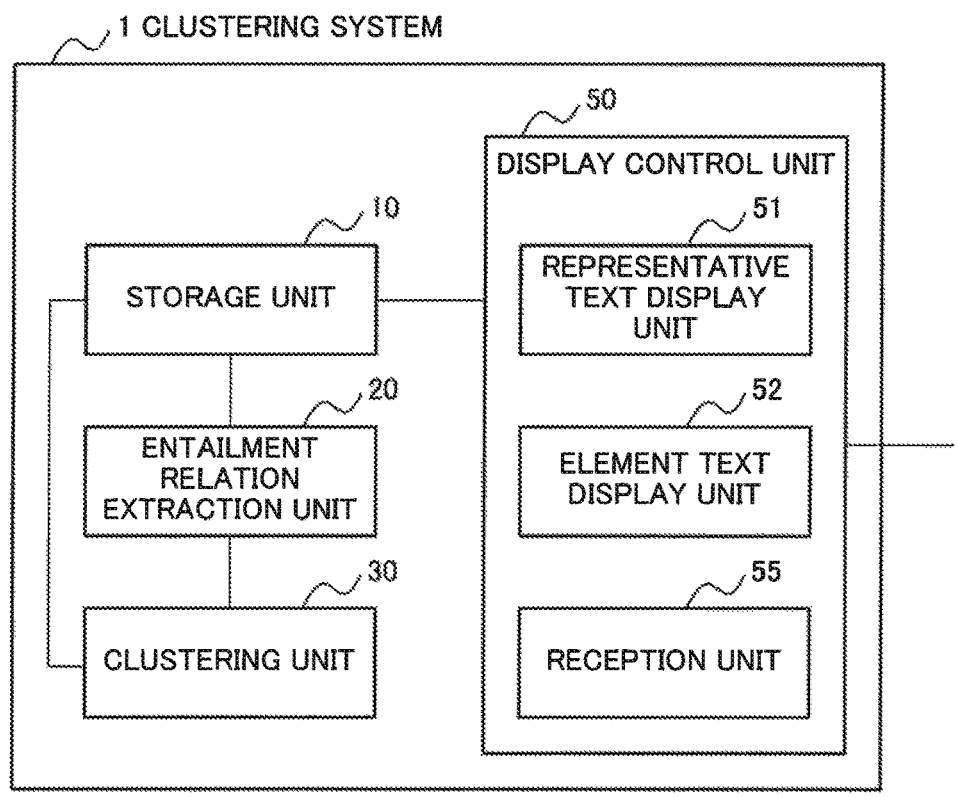
FIG. 2 is a block diagram illustrating a configuration of a clustering system 1 in the first example embodiment of the present invention.

FIG. 2 is a block diagram illustrating a configuration of a clustering system 1 in the first example embodiment of the present invention.

Referring to FIG. 2, the clustering system 1 in the first example embodiment of the present invention includes a storage unit 10, an entailment relation extraction unit 20, a clustering unit 30, and a display control unit 50. The clustering system 1 is one example embodiment of the text visualization system of the present invention.

The storage unit 10 stores text data indicating respective texts of a plurality of categories included in documents to be clustered and a result of clustering (a clustering result) between texts of each category.

FIG. 5 is a diagram illustrating an example of text data in the first example embodiment of the present invention. The example of FIG. 5 is an example in which texts to be clustered are natural language texts relating to phenomena, causes, and measures extracted from documents about failure reports of a PC (personal computer). In the example of FIG. 5, text data include identifiers (D1, D2, . . . ) of documents and acquisition dates and times of the documents. The text data further includes texts included in the documents with respect to each category (a phenomenon, a cause, and a measure). A symbol in a parenthesis preceding a text indicates an identifier of the text.

A text is extracted, for example, by acquiring, from a document described for each of a plurality of categories (a phenomenon, a cause, and a measure), description for each category in accordance with a predetermined format. Further, a text may be extracted from a document written in a free format by identifying a description portion relating to each category. Further, a document may be, for example, a call log generated by voice-recognizing conversations in a call center and the like.

The entailment relation extraction unit 20 extracts an entailment relation between texts of each category included in documents to be clustered.

The clustering unit 30 executes entailment clustering for texts with respect to each category based on the extracted entailment relation. The clustering unit 30 generates a plurality of clusters in which a representative text and element texts each entailing the representative text are set.

The display control unit 50 generates, based on the clustering result, a clustering screen 80 for displaying a representative text of each category and element texts of a document to be displayed (hereinafter, described also as a target document), and displays (outputs) the generated clustering screen to the user or the like.

FIG. 8 is a diagram illustrating an example of the clustering screen 80 (before designating a representative text) in the first example embodiment of the present invention.

The clustering screen 80 includes a representative text display area 81 (81a, 81b, 81c) and an element text display area 82.

In a "cluster" column of the representative text display area 81, a representative text of each category is displayed. Further, in a "number" column, the number of documents including an element text that entails each representative text among target documents is displayed. A representative text of the representative text display area 81 may be displayed in a descending (or an ascending) order of the number of documents indicated in the "number" column.

In a "detailed text" column of the element text display area 82, an element text of each category of each target document is displayed, for example, in a time-series order, in association with a document identifier and an acquisition date and time.

The display control unit 50 includes a representative text display unit 51 (or a first display unit), an element text display unit 52 (or a second display unit), and a reception unit 55.

The reception unit 55 receives a designation of a condition (hereinafter, described also as a display condition) for a target document from the user or the like in the representative text display area 81. In the example embodiments of the present invention, as a display condition, a combination (AND condition) of representative texts (clusters) of each of one or more categories is designated. In this case, the target document is a document, among all the documents to be clustered, including an element text that entails a representative text of each of one or more categories designated by a display condition (belongs to a cluster of the representative text) with respect to all the one or more categories.

The element text display unit 52 extracts (narrows down) a target document in accordance with a display condition from documents to be clustered, and displays an element text of each category of the extracted document in the element text display area 82.

The representative text display unit 51 displays a representative text of each category in the representative text display area 81. Further, the representative text display unit 51 extracts (narrows down), from representative texts of categories different from a category for which a representative text is designated by a display condition, an associated representative text in accordance with the display condition, and displays the extracted associated representative text in the representative text display area 81. Herein, the associated representative text refers to a representative text of a category different from one or more categories for which a representative text is designated by a display condition and entailed by an element text included in a target document.

The clustering system 1 may be a computer that includes a CPU (Central Processing Unit) and a storage medium storing a program and operates by control based on the program.

Figure 3:
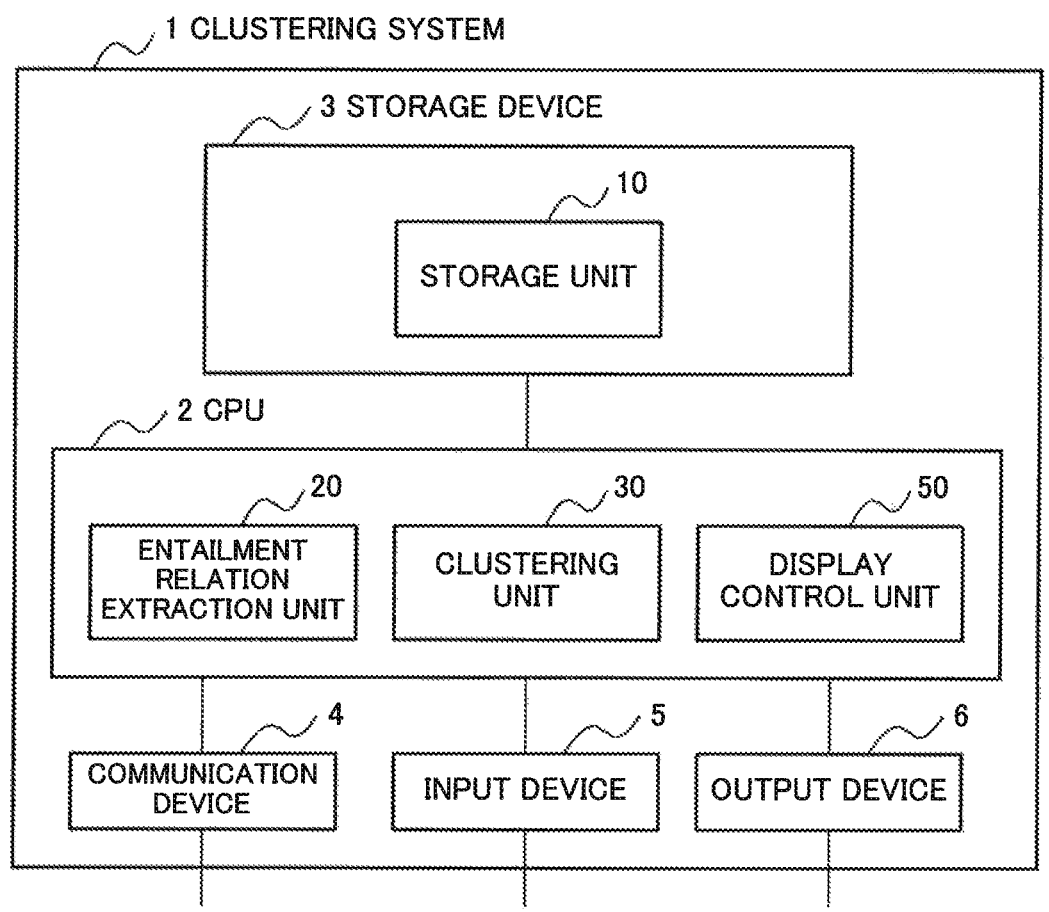
FIG. 3 is a block diagram illustrating a configuration of the clustering system 1 realized by a computer in the first example embodiment of the present invention.

FIG. 3 is a block diagram illustrating a configuration of the clustering system 1 realized by a computer in the first example embodiment of the present invention.

The clustering system 1 includes a CPU 2, a storage device (storage medium) 3 such as an HDD (hard disk drive) and a memory, a communication device 4 that communicates with another apparatus and the like, an input device 5 such as a mouse and a keyboard, and an output device 6 such as a display.

The CPU 2 executes computer programs for realizing functions of the entailment relation extraction unit 20, the clustering unit 30, and the display control unit 50. The storage device 3 stores data of the storage unit 10. The output device 6 outputs the clustering screen 80 to the user or the like. The input device 5 receives a designation of a display condition from the user or the like. Further, the communication device 4 may output the clustering screen 80 to another apparatus and receive a designation of a display condition from another apparatus.

Further, the components of the clustering system 1 illustrated in FIG. 2 may be independent logic circuits. Further, the components of the clustering system 1 illustrated in FIG. 2 may be arranged distributively in a plurality of physical apparatuses connected via a wired or wireless channel.

Next, the operation of the first example embodiment of the present invention will be described.

Herein, it is assumed that text data as in FIG. 5 is stored on the storage unit 10.

Figure 4:
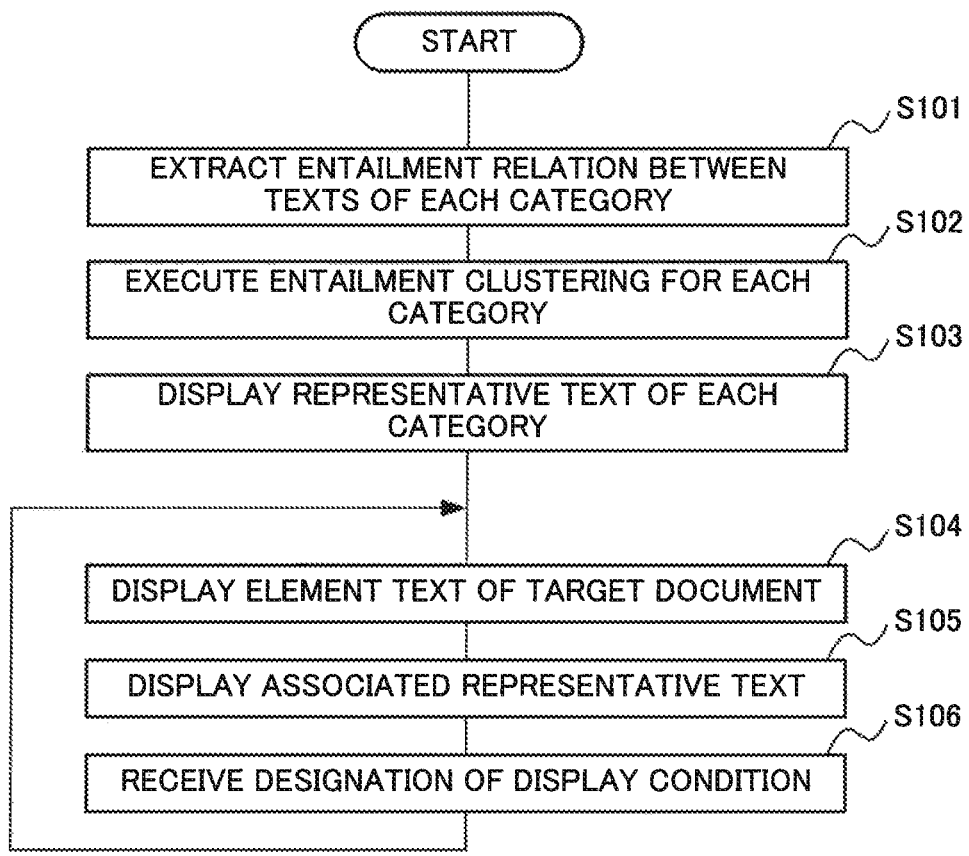
FIG. 4 is a flowchart illustrating an operation of the clustering system 1 in the first example embodiment of the present invention.

FIG. 4 is a flowchart illustrating the operation of the clustering system 1 in the first example embodiment of the present invention.

First, the entailment relation extraction unit 20 extracts an entailment relation between texts of each category of documents to be clustered stored on the storage unit 10 (step S101).

Herein, the entailment relation extraction unit 20 extracts an entailment relation between texts by executing, for example, the same determination process as in PTL 1. In this case, the entailment relation extraction unit 20 compares content words included in texts, calculates a coverage ratio, and thereby determines the presence or absence of an entailment relation. The entailment relation extraction unit 20 may determine an entailment relation between texts by determination processing different from that of PTL 1, as long as an entailment relation between texts is extracted.

Figure 6:
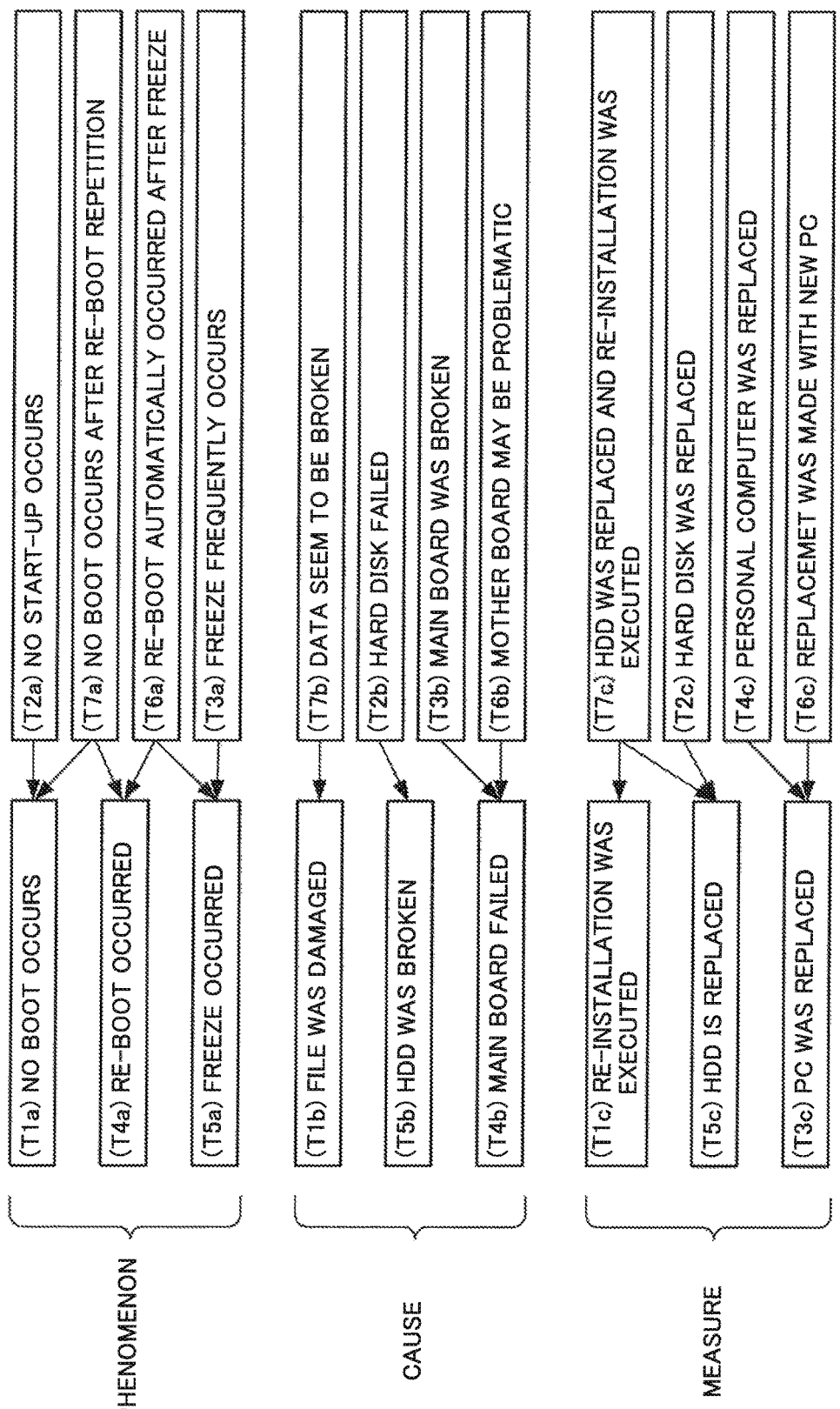
FIG. 6 is a diagram illustrating an example of an extraction result of entailment relations in the first example embodiment of the present invention.

FIG. 6 is a diagram illustrating an example of an extraction result of entailment relations in the first example embodiment of the present invention. In FIG. 6, it is indicated that a text at a source of an arrow entails a text at a destination of the arrow. In the example of FIG. 6, with respect to a category "phenomenon", for example, texts T2a and T7a entail a text T1a.

For example, the entailment relation extraction unit 20 extracts an entailment relation with respect to a text of each category of FIG. 5, as illustrated in FIG. 6.

The clustering unit 30 executes entailment clustering for texts of each category of documents to be clustered stored on the storage unit 10 (step S102).

Herein, the clustering unit 30 executes entailment clustering, for example, based on the entailment relation extracted by the entailment relation extraction unit 20 in the same manner as the technique of NPL 2. As a result of clustering, when a text entails a plurality of representative texts, the text is set as an element text of a plurality of clusters. In the example embodiments of the present invention, a text set as a representative text of a certain cluster is also set as an element text that entails the representative text of the cluster. The clustering unit 30 stores, on the storage unit 10, a clustering result that associates an identifier of a representative text of each cluster with an identifier of an element text of the cluster, with respect to each category.

FIG. 7 is a diagram illustrating an example of a clustering result in the first example embodiment of the present invention. In the example of FIG. 7, texts T1a, T4a, and T5a are set as representative texts of clusters A1, A2, and A3, respectively, with respect to a phenomenon category, for example. Further, the text T1a and texts T2a and T7a that entail the text T1a are set as element texts of the cluster A1.

For example, the clustering unit 30 generates a clustering result as illustrated in FIG. 7 based on the entailment relation of FIG. 6.

The clustering unit 30 may further integrate, based on an overlap degree of element texts between two different clusters, the two clusters into one cluster in each category.

Next, the representative text display unit 51 of the display control unit 50 displays, based on a clustering result stored on the storage unit 10, a representative text of each category in the representative text display area 81 of the clustering screen 80 (step S103).

For example, the representative text display unit 51 displays representative texts T1a, T4a, and T5a in the representative text display area 81a as in FIG. 8 with respect to a phenomenon category, based on the clustering result of FIG. 7. In the same manner, the representative text display unit 51 displays representative texts T1b, T5b, and T4b in the representative text display area 81b with respect to a cause cluster and displays representative texts T1c, T5c, and T3c in the representative text display area 81c with respect to a measure cluster.

The element text display unit 52 extracts a target document from documents to be clustered in accordance with a display condition, and displays element texts of each category of the extracted document in the element text display area 82 (step S104). At the beginning, a display condition is not designated, and therefore, for example, all the documents to be clustered are used as target documents.

For example, the element text display unit 52 displays element texts of each category in the element text display area 82 with respect to all the documents D1 to D7 to be clustered, as in FIG. 8.

The representative text display unit 51 extracts an associated representative text in accordance with a display condition, and displays the extracted associated representative text in the representative text display area 81 (step S105). Further, at the same time, the representative text display unit 51 updates the number of documents of the representative text display area 81 according to target documents. At the beginning, a display condition is not designated, and therefore extraction of an associated representative text is omitted.

For example, the representative text display unit 51 displays the number of documents including an element text that entails each representative text among all the documents D1 to D7 to be clustered in the representative text display areas 81a to 81c, as in FIG. 8.

The user or the like refers to the representative text display area 81 of the clustering screen 80 of FIG. 8, and thereby can ascertain overall phenomena, causes, and measures as well as the numbers of occurrence thereof at an outline level.

Next, the reception unit 55 receives a designation of a display condition (representative text) in the clustering screen 80 (step S106).

Herein, the reception unit 55 receives, for example, by mouse-click detection of a representative text displayed in the representative text display area 81, a designation of the representative text.

Thereafter, processing from step S104 is repeated, and every time a display condition is received, the clustering screen 80 is updated in accordance with the display condition.

Using several examples of the display condition, the operation of steps S104 to S106 will be described below.

<A Case where a Representative Text of a Phenomenon Category has been Designated as a Display Condition>

A case where the user or the like analyzes an associated cause and measure for a phenomenon "no boot occurs" of an outline level in the representative text display area 81 of FIG. 8 will be considered. For example, the reception unit 55 receives a designation of a representative text T1a "no boot occurs" of a phenomenon category from the user or the like in the representative text display area 81a of FIG. 8.

Figure 9:
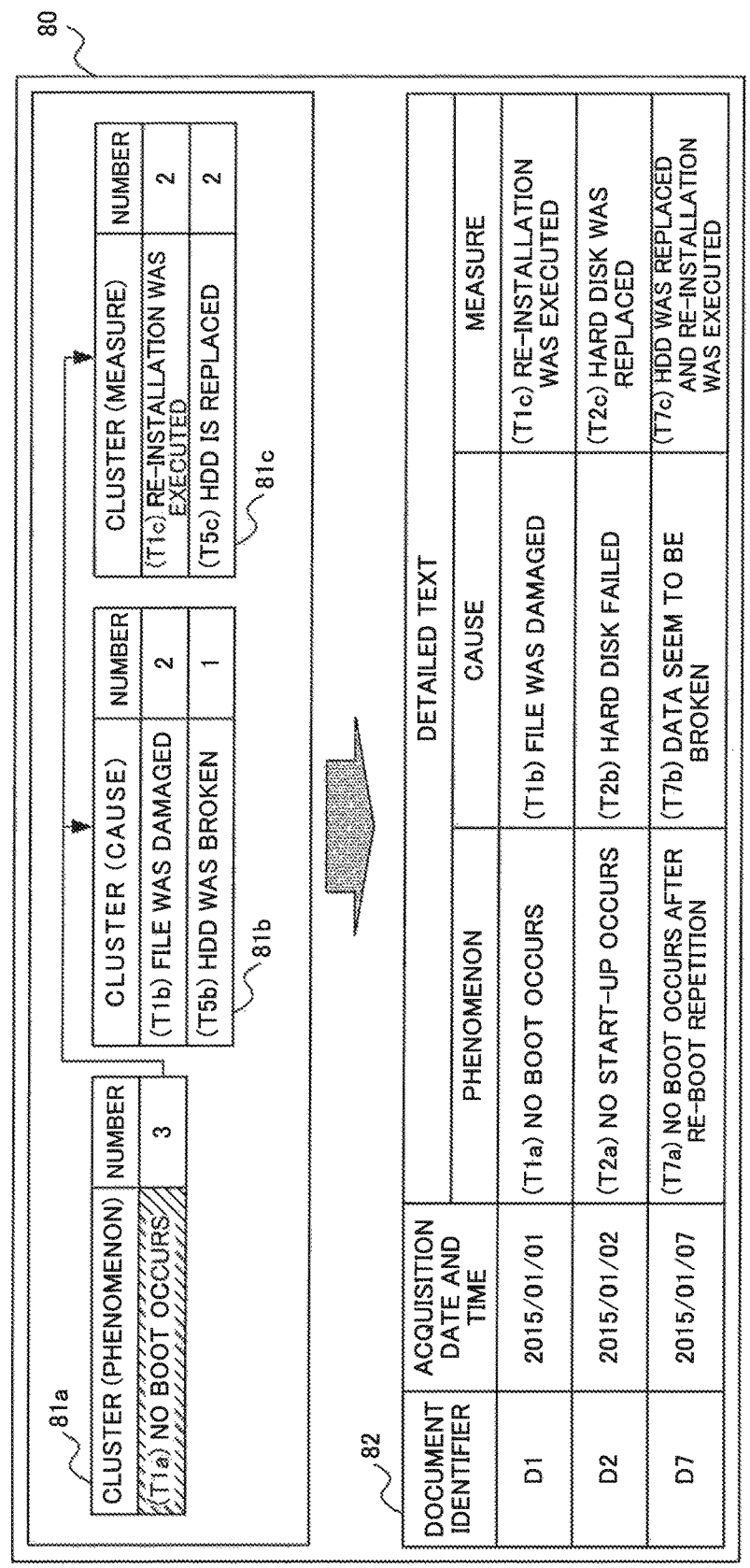
FIG. 9 is a diagram illustrating an example of the clustering screen 80 (upon designating a representative text of a phenomenon category) in the first example embodiment of the present invention.

FIG. 9 is a diagram illustrating an example of the clustering screen 80 (upon designating a representative text of a phenomenon category) in the first example embodiment of the present invention.

In this case, target documents in accordance with the display condition (the representative text T1a) are documents D1, D2, and D7 including the element texts T1a, T2a, and T7a, respectively, that entail the representative text T1a.

The element text display unit 52 displays, as in FIG. 9, element texts of the documents D1, D2, and D7 that are target documents in the element text display area 82.

The representative text display unit 51 displays representative texts T1b and T5b entailed by element texts included in the target documents D1, D2, and D7 in the representative text display area 81b as associated representative texts of the cause category for the representative text T1a, as in FIG. 9. Further, the representative text display unit 51 displays representative texts T1c and T5c entailed by element texts included in the target documents D1, D2, and D7 in the representative text display area 81c as associated representative texts of the measure category for the representative text T1a. Further, the representative text display unit 51 updates the number of documents for each representative text of the representative text display area 81 with the number of documents including an element text that entails each representative text among the target documents D1, D2, and D7, as in FIG. 9.

The user or the like refers to the representative text display area 81 of the clustering screen 80 of FIG. 9 and thereby can ascertain a cause, a measure, and the numbers of occurrence thereof associated with a designated phenomenon at an outline level. Further, the user or the like refers to the element text display area 82 and thereby can ascertain details of the designated phenomenon and a cause and measure associated with the phenomenon.

<A Case where Representative Texts of a Phenomenon Category and a Cause Category have been Designated as a Display Condition>

A case where the user or the like analyzes an associated measure for a phenomenon "no boot occurs" and a cause "an HDD was broken" of an outline level in the representative text display area 81 of FIG. 9 will be considered. For example, the reception unit 55 further receives a designation of a representative text T5b "an HDD was broken" of the cause category from the user or the like in the representative text display area 81b of FIG. 9.

Figure 10:
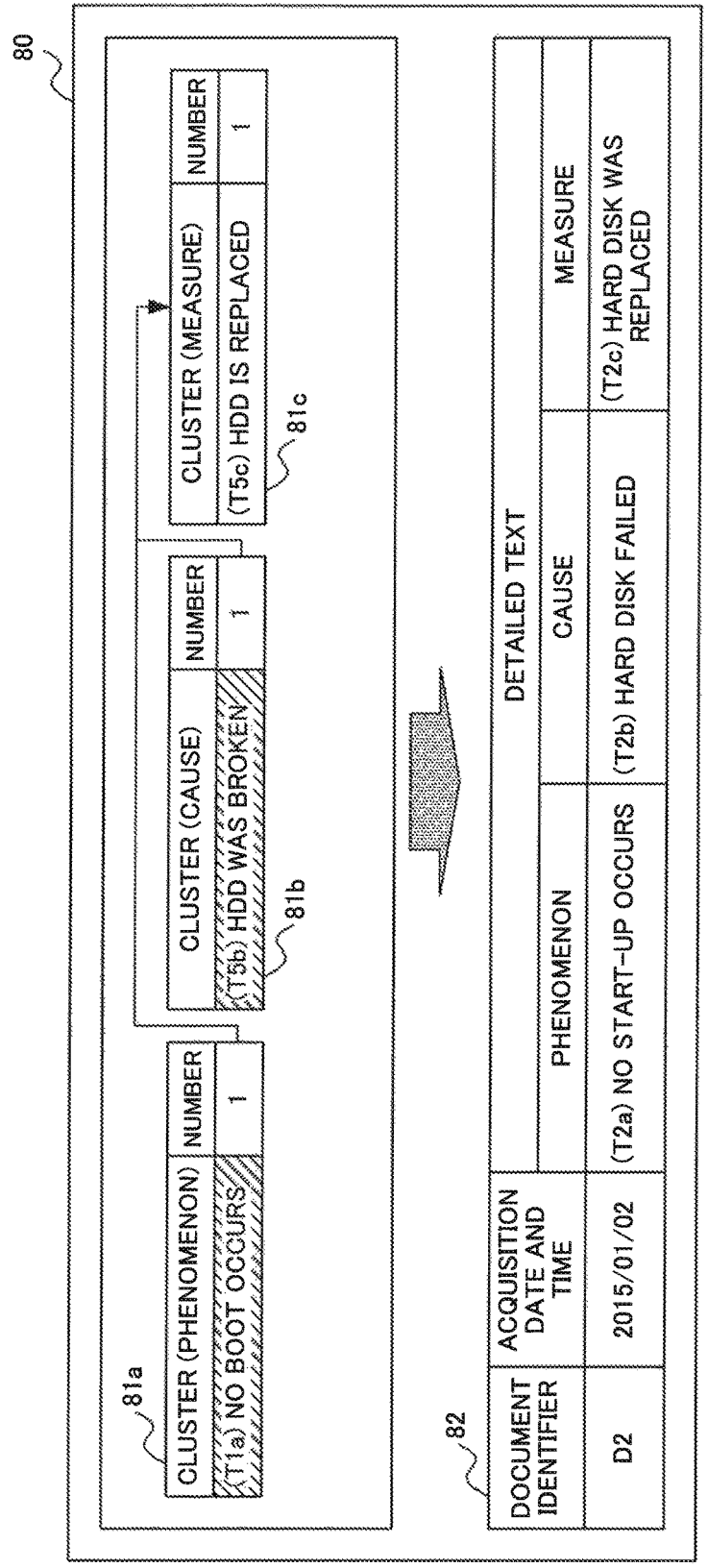
FIG. 10 is a diagram illustrating an example of the clustering screen 80 (upon designating representative texts of a phenomenon category and a cause category) in the first example embodiment of the present invention.

FIG. 10 is a diagram illustrating an example of the clustering screen 80 (upon designating representative texts of a phenomenon category and a cause category) in the first example embodiment of the present invention.

In this case, a target document in accordance with a display condition (a combination of representative texts T1a and T5b) is a document D2 including an element text T2a that entails the representative text T1a and an element text T2b that entails the representative text T5b.

The element text display unit 52 displays an element text of the document D2 that is a target document in the element text display area 82, as in FIG. 10.

The representative text display unit 51 displays a representative text T5c entailed by an element text included in the target document D2 in the representative text display area 81c as an associated representative text of a measure category for the combination of the representative texts T1a and T5b, as in FIG. 10.

<A Case where a Representative Text of a Cause Category has been Designated as a Display Condition>

A case where the user or the like analyzes an associated phenomenon and measure for a phenomenon "a main board failed" of an outline level in the representative text display area 81 of FIG. 8 will be considered. For example, the reception unit 55 receives a designation of a representative text T4b "a main board failed" of a cause category from the user or the like in the representative text display area 81b of FIG. 8.

Figure 11:
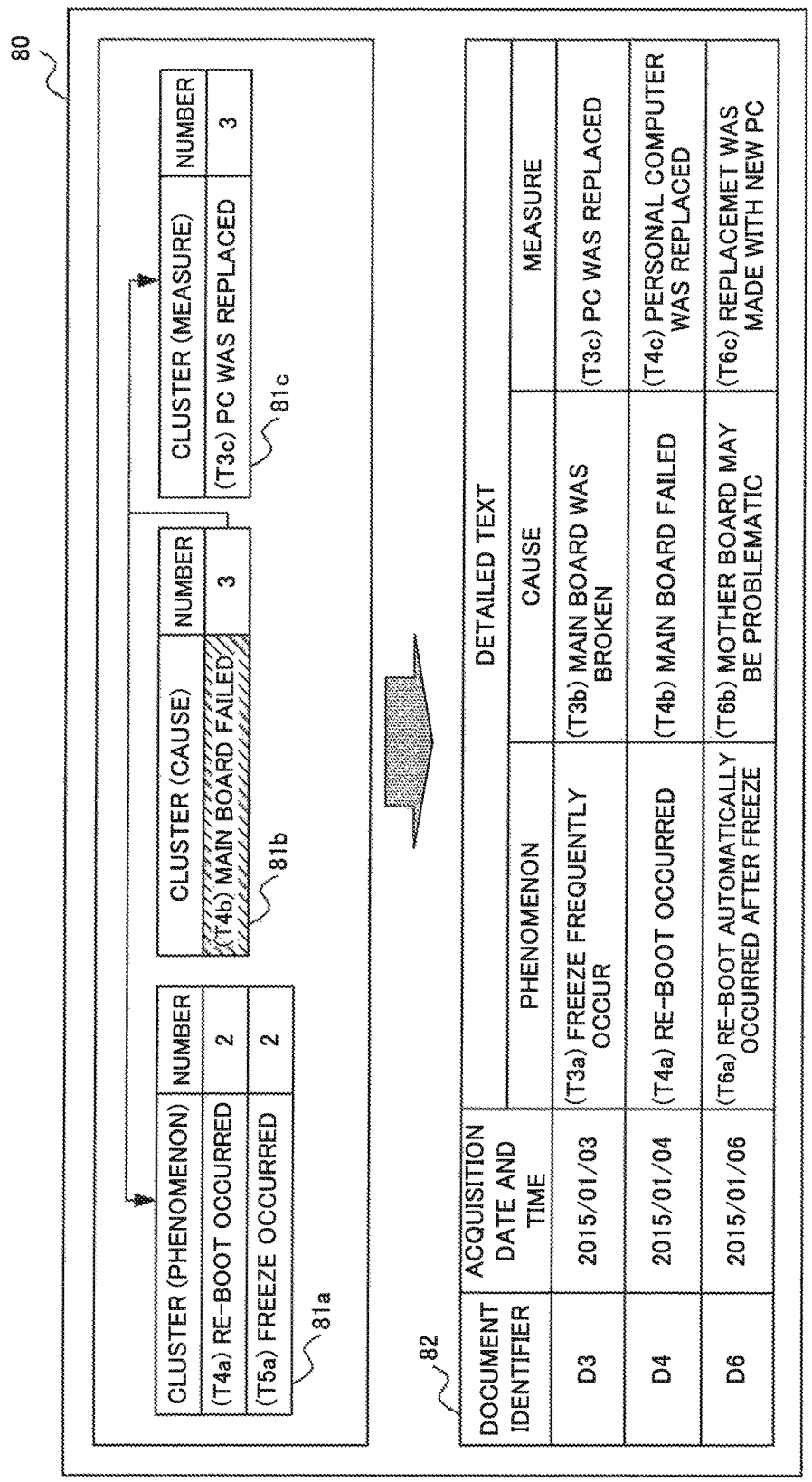
FIG. 11 is a diagram illustrating an example of the clustering screen 80 (upon designating a representative text of a cause category) in the first example embodiment of the present invention.

FIG. 11 is a diagram illustrating an example of the clustering screen 80 (upon designating a representative text of a cause category) in the first example embodiment of the present invention.

In this case, target documents in accordance with the display condition (the representative text T4b) are documents D3, D4, and D6 including element texts T3b, T4b, and T6b, respectively, that entail the representative text T4b.

The element text display unit 52 displays element texts of the documents D3, D4, and D6 that are target documents in the element text display area 82, as in FIG. 11.

The representative text display unit 51 displays representative texts T4a and T5a entailed by element texts included in the target documents D3, D4, and D6 in the representative text display area 81a as associated representative texts of the phenomenon category for the representative text T4b, as in FIG. 11. Further, the representative text display unit 51 displays a representative text T3c entailed by element texts included in the target documents D3, D4, and D6 in the representative text display area 81c as an associated representative text of the measure category for the representative text T1a. Further, the representative text display unit 51 updates the number of documents for each representative text of the representative text display area 81 with the number of documents including an element text that entails each representative text among the target documents D3, D4, and D6, as in FIG. 11.

The user or the like refers to the representative text display area 81 of the clustering screen 80 of FIG. 11 and thereby can ascertain phenomena, measures, and the numbers of occurrences thereof associated with a designated cause at an outline level. Further, the user or the like refers to the element text display area 82 and thereby can ascertain details of a designated cause and phenomena and measures associated with the cause.

In the above examples, cases where display conditions are "a representative text of a phenomenon category", "representative texts of a phenomenon category and a cause category", and "a representative text of a cause category" have been described. However, without limitation thereto, as a display condition, a representative text of each category may be designated for any combination of one or more of a phenomenon, a cause, and a measure.

As described above, the operation of the first example embodiment of the present invention is completed.

In the first example embodiment of the present invention, a case where categories of texts to be clustered are a phenomenon, a cause, and a measure relating to PC failures has been described as an example. However, without limitation thereto, categories to be clustered may be a phenomenon, a cause, and a measure relating to problems with respect to other products, services, and the like. Further, categories to be clustered may be a subject of complaints from customers, a content of complaints, and a demand. Further, categories to be clustered may be any categories as long as the categories are included in each document and associated with each other.

Further, in the first example embodiment of the present invention, the element text display unit 52 displays, by using all the documents to be clustered as target documents, element texts of the target documents in the element text display area 82, in a stage where a display condition is not designated. Without limitation thereto, the element text display unit 52 may omit display of element texts of a target document in a stage where a display condition is not designated.

Further, in the first example embodiment of the present invention, the element text display unit 52 displays element texts of a target document with respect to all the categories in the element text display area 82. Without limitation thereto, the element text display unit 52 may display an element text of a target document with respect to a specific category.

Further, in the first example embodiment of the present invention, the representative text display unit 51 displays all the representative texts of all the categories in the representative text display area 81 in a stage where a display condition is not designated. Without limitation thereto, the representative text display unit 51 may display only a representative text of a category for which a designation is to be received as a display condition in a stage where a display condition is not designated.

Further, in the first example embodiment of the present invention, the element text display unit 52 displays, as a display method for an element text of an extracted target document, only an element text of an extracted target document in the element text display area 82. Without limitation thereto, the element text display unit 52 may highlight an element text of an extracted target document while displaying element texts of all the documents or specific documents to be clustered.

Further, in the first example embodiment of the present invention, the representative text display unit 51 displays, as a display method for an extracted representative text of each category, only an extracted representative text in the representative text display area 81. Without limitation thereto, the representative text display unit 51 may highlight an extracted representative text while displaying all the representative texts or a specific representative text of each category.

Next, a basic configuration of the first example embodiment of the present invention will be described.

Figure 1:
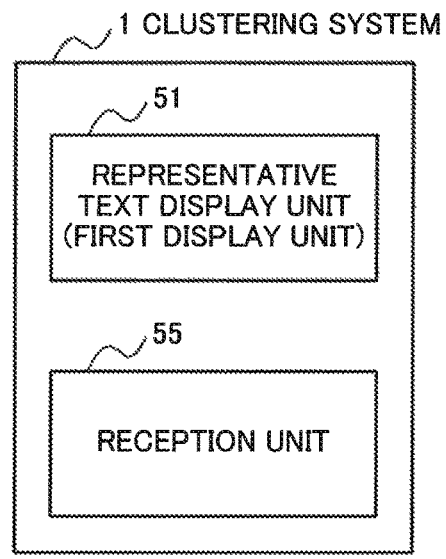
FIG. 1 is a block diagram illustrating a basic configuration of a first example embodiment of the present invention.

FIG. 1 is a block diagram illustrating a basic configuration of the first example embodiment of the present invention. Referring to FIG. 1, a clustering system 1 (text visualization system) in the first example embodiment of the present invention includes a representative text display unit 51 (first display unit) and a reception unit 55. The clustering system 1 is accessibly connected to a storage. The storage stores texts of each of a plurality of categories included in each of a plurality of documents. The storage further stores information indicating a representative text and an element text that entails the representative text among texts included in the plurality of documents with respect to each of the plurality of categories. The representative text display unit 51 displays a plurality of representative texts of each of one or more categories among the plurality of categories. The reception unit 55 receives a designation of a representative text of a specific category among the plurality of representative texts of each of the one or more categories. The representative text display unit 51 extracts, from a plurality of representative texts of another category, a representative text that entails an element text of the another category included in a document including an element text that entails a designated representative text of the specific category, and displays the extracted representative text.

Next, advantageous effects of the first example embodiment of the present invention will be described.

According to the first example embodiment of the present invention, in clustering of documents including texts of a plurality of categories, a user can ascertain a relationship of viewpoints between categories. The reason is as follows. The representative text display unit 51 displays a representative text of each of a plurality of categories. The representative text display unit 51 extracts, from a plurality of representative texts of another category, a representative text that entails an element text of the another category included in a document including an element text that entails a representative text of a designated specific category, and displays the extracted representative text.

Thereby, the user can first ascertain a viewpoint of each category at an outline level based on a representative text of each category and then can ascertain, by designating a representative text of a viewpoint of a specific category, a viewpoint of another category associated with the viewpoint.

Second Example Embodiment

Next, a second example embodiment of the present invention will be described.

The second example embodiment of the present invention is different from the first example embodiment of the present invention in a point that a display control unit 50 displays an analysis table 91.

First, a configuration of the second example embodiment of the present invention will be described.

Figure 12:
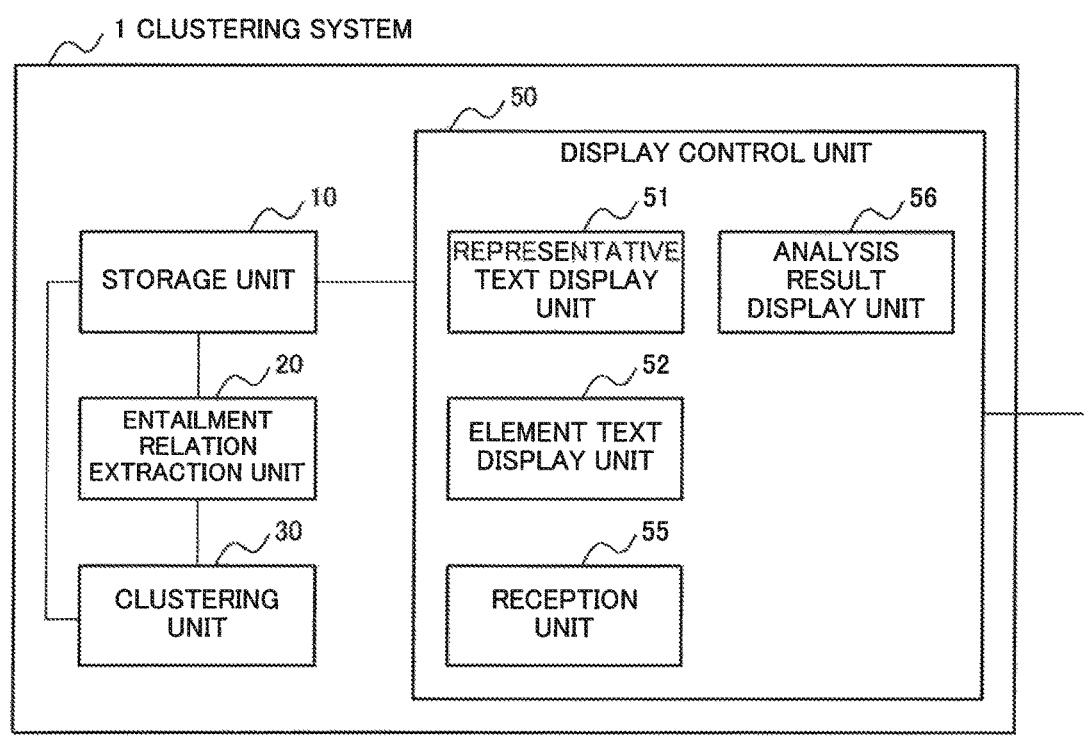
FIG. 12 is a block diagram illustrating a configuration of a clustering system 1 in a second example embodiment of the present invention.

FIG. 12 is a block diagram illustrating a configuration of a clustering system 1 in the second example embodiment of the present invention.

Referring to FIG. 12, the clustering system 1 of the second example embodiment of the present invention further includes an analysis result display unit 56 (or a third display unit) in the display control unit 50 in addition to the configuration of the clustering system 1 in the first example embodiment of the present invention.

The analysis result display unit 56 generates an analysis table 91 representing a relationship (correlation) between representative texts of two categories, and displays the generated analysis table.

Next, the operation of the second example embodiment of the present invention will be described.

In step S106 described above, the reception unit 55 of the display control unit 50 receives an instruction for generation of an analysis table 91. The analysis result display unit 56 generates the analysis table 91 for each set of two categories based on a clustering result. The analysis result display unit 56 tallies, for each pair of representative texts of two categories, the number of documents in which element texts of the two categories entail representative texts of the pair, among documents to be clustered. The analysis result display unit 56 generates a spreadsheet representing a tally result as the analysis table 91.

FIG. 13 is a diagram illustrating an example of an analysis screen 90 in the second example embodiment of the present invention. The analysis screen 90 includes an analysis table 91 (91a, b, and c). The analysis tables 91a, b, and c are analysis tables 91 each for phenomenon and cause categories, cause and measure categories, and phenomenon and measure categories.

The analysis result display unit 56 generates, for example, analysis tables 91a, b, and c as in FIG. 13 based on the clustering result of FIG. 7 and displays the generated analysis tables on the analysis screen 90.

The user or the like refers to the analysis screen 90 of FIG. 13 and can easily ascertain, between two categories among a phenomenon, a cause, and a measure of an outline level, the number of occurrences of each pair of viewpoints of these categories.

The analysis result display unit 56 may further generate a table in which an adjusted standardized residual or the like is calculated for each cell of the above-described spreadsheet, as the analysis table 91 representing a correlation between categories. Further, the analysis result display unit 56 may generate a table representing a relationship calculated by another method as the analysis table 91 as long as the relationship between categories can be calculated. For example, the analysis result display unit 56 may generate a table in which, instead of an adjusted standardized residual, a standardized residual or simply a residual is calculated for each cell of the above-described spreadsheet. Further, the analysis result display unit 56 may indicate a relationship between categories by using a chi-square value or a log-likelihood ratio.

As described above, the operation of the second example embodiment of the present invention is completed.

Next, advantageous effects of the second example embodiment of the present invention will be described.

According to the second example embodiment of the present invention, in clustering of documents including texts of a plurality of categories, a user can easily ascertain a relationship of viewpoints between two categories. The reason is that the analysis result display unit 56 generates, for two categories, the analysis table 91 representing a relationship between representative texts respectively entailed by element texts of the two categories, included in documents, and displays the generated analysis table. Note that, in the above-described keyword-based clustering, a viewpoint of each cluster becomes unclear, and therefore even if a table representing a relationship of clusters between categories is generated, it is difficult to obtain a meaningful result.

While the invention has been particularly described with reference to exemplary embodiments thereof, the invention is not limited to these embodiments. It will be understood by those of ordinary skill in the art that various changes in form and details may be made therein without departing from the scope of the present invention as defined by the claims.

INDUSTRIAL APPLICABILITY

The present invention is applicable to a system for clustering a large amount of document data. For example, the present invention is applicable to a system that analyzes a call log, opinions of customers, and the like for improvements of products and services, marketing, and improvements of efficiency of business activities. Further, the present invention is also applicable to a system that analyzes failures of products, evaluations for products, and demands for products, or a system that analyzes academic documents. Further, the present invention is also applicable to a system that analyzes questions about customer supports and generates FAQ (Frequency Asked Questions).

REFERENCE SIGNS LIST

1 Clustering system
2 CPU
3 Storage device
4 Communication device
5 Input device
6 Output device
10 Storage unit
20 Entailment relation extraction unit
30 Clustering unit
50 Display control unit
51 Representative text display unit
52 Element text display unit
55 Reception unit
56 Analysis result display unit
80 Clustering screen
81 Representative text display area
82 Element text display area
90 Analysis screen
91 Analysis table

What is claimed is:

1. A text visualization system accessibly connected to a storage that stores texts of each of a plurality of categories included in each of a plurality of documents and information indicating a representative text and an element text that entails the representative text among texts included in the plurality of documents with respect to each of the plurality of categories, the text visualization system comprising:
   a memory storing instructions; and
   one or more processors configured to execute the instructions to:
      in a representative text display area, for each of the plurality of categories, display a respective plurality of representative texts;
      receive a designation of a first representative text of a specific category in a first document among the displayed plurality of representative texts;
      determine an element text of the specific category that entails the designated first representative text of the specific category;
      determine the first document or a second document that includes the determined element text;
      determine an element text of another category that is included in the determined first or second document, wherein the another category is different from the specific category;
      determine, from among the plurality of representative texts of the another category, a second representative text of the another category that is entailed by the determined element text of the another category in the second document or a third document; and
      update the representative text display area by displaying the designated first representative text for the specific category and displaying the determined second representative text for the another category.

2. The text visualization system according to claim 1, wherein
   the one or more processors are further configured to further execute the instructions to extract, in response to receiving the designation of the representative text of the specific category, a document including an element text that entails the designated representative text of the specific category from the plurality of documents, and display a respective element text of each of one or more categories among the plurality of categories, included in the extracted document.

3. The text visualization system according to claim 1, wherein
a designation of a respective representative text of each of a plurality of specific categories among a plurality of representative texts of each of the one or more categories is received, and,
in response to receiving the designation of the respective representative text of each of the plurality of specific categories, for each designated representative text, extract a second representative text that is entailed by an element text of another category included in a document including an element text that entails the designated representative text of each of the plurality of specific categories with respect to all the plurality of specific categories is extracted, and the extracted representative text is displayed.

4. The text visualization system according to claim 3, wherein
the one or more processors are further configured to further execute the instructions to extract, in response to receiving the designation of the representative text of each of the plurality of specific categories, from the plurality of documents, a document including an element text that entails the designated representative text of each of the plurality of specific categories with respect to all the plurality of specific categories, and display a respective element text for each category of one or more categories among the plurality of categories, included in the extracted document.

5. The text visualization system according to claim 1, wherein
the one or more processors are further configured to further execute the instructions to display, with respect to two categories among the plurality of categories, a table representing a relationship between representative texts of the two categories.

6. A text visualization method for texts of each of a plurality of categories included in each of a plurality of documents, a representative text and an element text that entails the representative text being set among the texts included in the plurality of documents with respect to each of the plurality of categories, the text visualization method comprising:
in a representative text display area, for each of the plurality of categories, displaying a respective plurality of representative texts;
receiving a designation of a first representative text of a specific category in a first document among the displayed plurality of representative texts;
determining an element text of the specific category that entails the designated first representative text of the specific category, wherein the another category is different from the specific category;
determining the first document or a second document that includes the determined element text;
determining an element text of another category that is included in the determined first or second document;
determining, from among the plurality of representative texts of the another category, a second representative text of the another category that is entailed by the determined element text of the another category in the second document or a third document; and
updating the representative text display area by displaying the designated first representative text for the specific category and displaying the determined second representative text for the another category.

7. A non-transitory computer readable storage medium recording thereon a program causing a computer to perform a text visualization method for texts of each of a plurality of categories included in each of a plurality of documents, a representative text and an element text that entails the representative text being set among the texts included in the plurality of documents with respect to each of the plurality of categories, the method comprising:
in a representative text display area, for each of the plurality of categories, displaying a respective plurality of representative texts;
receiving a designation of a first representative text of a specific category in a first document among the displayed plurality of representative text;
determining an element text of the specific category that entails the designated first representative text of the specific category, wherein the another category is different from the specific category;
determining the first document or a second document that includes the determined element text;
determining an element text of another category that is included in the determined first or second document;
determining, from among the plurality of representative texts of the another category, a second representative text of the another category in the second document or a third document that is entailed by the determined element text of the another category; and
updating the representative text display area by displaying the designated first representative text for the specific category and displaying the determined second representative text for the another category.

* * * * *